United States Patent
Mizukami

(10) Patent No.: US 9,776,359 B2
(45) Date of Patent: Oct. 3, 2017

(54) IMPRINT MOLD MANUFACTURING METHOD

(71) Applicant: Soken Chemical & Engeering Co., Ltd., Tokyo (JP)

(72) Inventor: Yutaka Mizukami, Saitama (JP)

(73) Assignee: SOKEN CHEMICAL & ENGINEERING Co., Ltd., Tokyo (JP)

( * ) Notice: Subject to any disclaimer, the term of this patent is extended or adjusted under 35 U.S.C. 154(b) by 308 days.

(21) Appl. No.: 14/443,326

(22) PCT Filed: Nov. 18, 2013

(86) PCT No.: PCT/JP2013/081013
§ 371 (c)(1),
(2) Date: May 15, 2015

(87) PCT Pub. No.: WO2014/080858
PCT Pub. Date: May 30, 2014

(65) Prior Publication Data
US 2015/0336324 A1    Nov. 26, 2015

(30) Foreign Application Priority Data

Nov. 22, 2012 (JP) ................................ 2012-256556

(51) Int. Cl.
*B29C 59/04*    (2006.01)
*B29C 53/08*    (2006.01)
(Continued)

(52) U.S. Cl.
CPC .......... *B29C 53/08* (2013.01); *B29C 37/0053* (2013.01); *B29C 37/0067* (2013.01);
(Continued)

(58) Field of Classification Search
CPC ....... B29C 59/02; B29C 59/04; B29C 33/424; B29C 2035/0827; B29C 53/56;
(Continued)

(56) References Cited

U.S. PATENT DOCUMENTS 8,027,086 B2 *  9/2011  Guo ....................... B82Y 40/00
                                                    264/1.31
2008/0299247 A1  12/2008 Ogino et al.
2012/0038084 A1 *  2/2012 Lee ......................... B29C 33/40
                                                    264/293

FOREIGN PATENT DOCUMENTS

JP    3-235233 A    10/1991
JP    7-24914 A     1/1995
(Continued)

OTHER PUBLICATIONS

Extended European Search Report dated Aug. 29, 2016, including the Supplementary European Search Report and the European Search Opinion, in connection with counterpart EP Application No. 13856381.2 (6 pgs).

(Continued)

*Primary Examiner* — Carson Gross
(74) *Attorney, Agent, or Firm* — Maier & Maier, PLLC

(57) ABSTRACT

A method for manufacturing an imprint mold which can prevent accumulation of the transferring resin onto the transferring roll is provided. A method for manufacturing an imprint mold, including: a resin coating step to coat a photo-curing resin composition or a thermosetting resin composition onto a pattern transferring mold having a fine concave-convex pattern; and a transferring step to transfer the resin composition throughout the entire circumference of a cylindrical transferring roll and cure the resin composition so that a reverse pattern of the concave-convex pattern is (Continued)

formed throughout the entire circumference of the cylindrical transferring roll, is provided.

7 Claims, 4 Drawing Sheets

(51) Int. Cl.
*B29C 37/00* (2006.01)
*B29L 31/00* (2006.01)
*B29C 53/56* (2006.01)
*B29C 35/08* (2006.01)
*B29C 59/02* (2006.01)

(52) U.S. Cl.
CPC .............. *B29C 59/04* (2013.01); *B29C 53/56* (2013.01); *B29C 53/562* (2013.01); *B29C 2035/0827* (2013.01); *B29C 2059/023* (2013.01); *B29L 2031/757* (2013.01)

(58) Field of Classification Search
CPC . B29C 53/562; B29C 2059/023; B05D 3/067; B29L 2031/757
See application file for complete search history.

(56) References Cited

FOREIGN PATENT DOCUMENTS

| | | |
|---|---|---|
| JP | 2003-181918 A | 7/2003 |
| JP | 2006-64455 A | 3/2006 |
| JP | 2010-149492 A | 7/2010 |
| JP | 2011-83984 A | 4/2011 |
| WO | 2011049097 A1 | 4/2011 |

OTHER PUBLICATIONS

International Search Report dated Jan. 7, 2014 from corresponding International Patent Application No. PCT/JP2013/081013; 2 pgs.

\* cited by examiner

[FIG. 1]
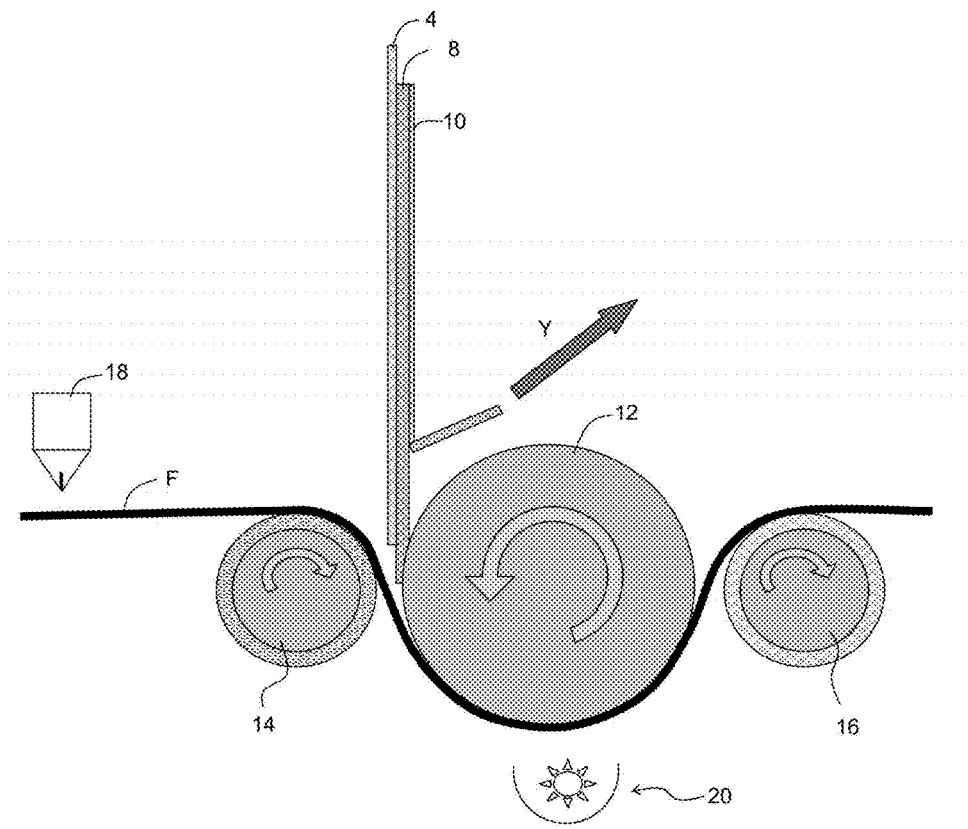
[FIG. 2]
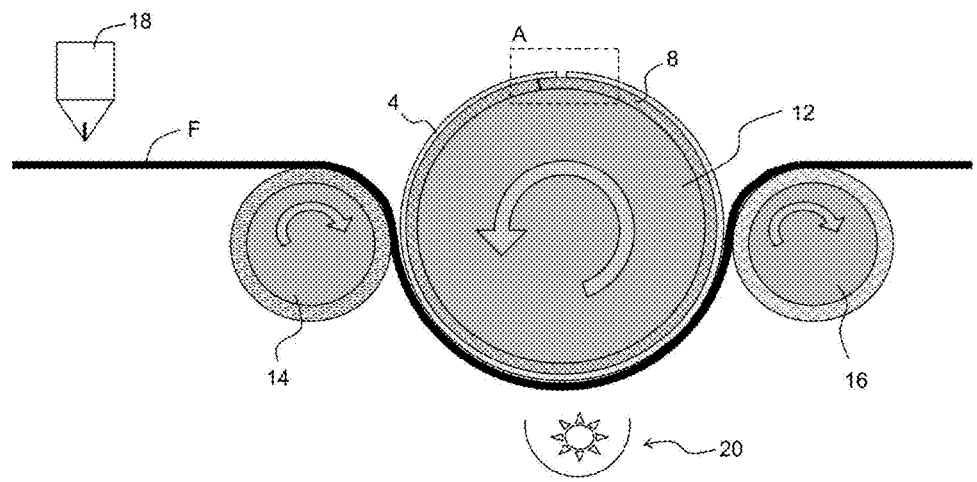

[FIG. 3]
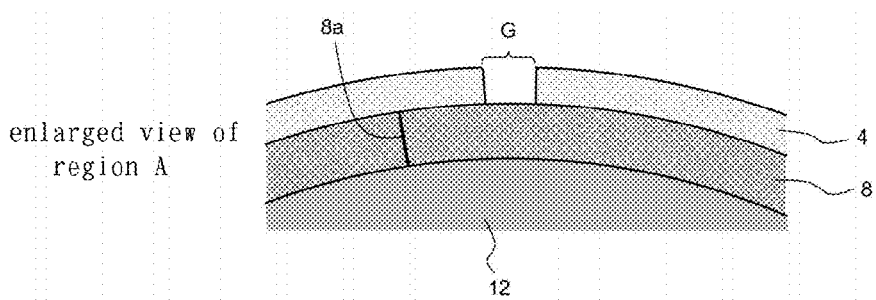
[FIG. 4]
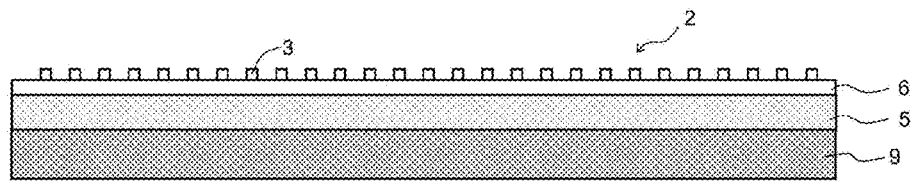
[FIG. 5]
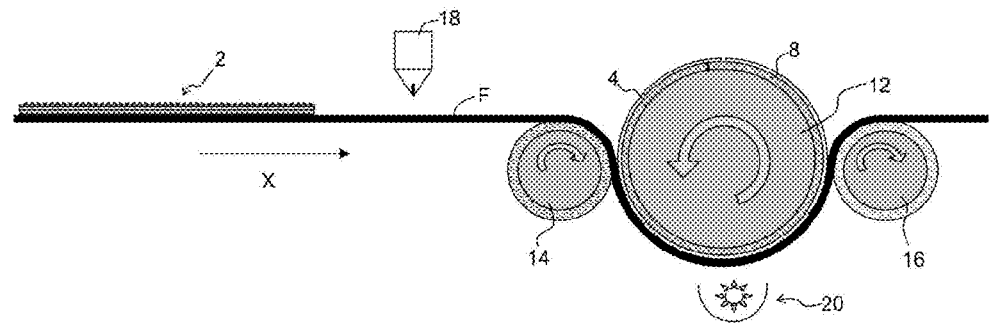
[FIG. 6]
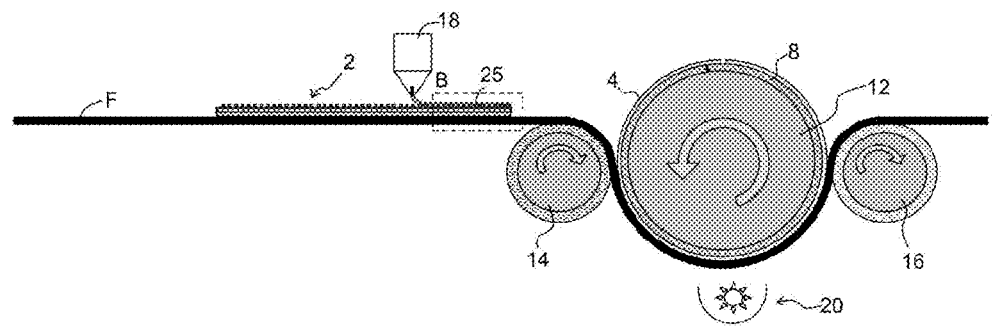

[FIG. 7]
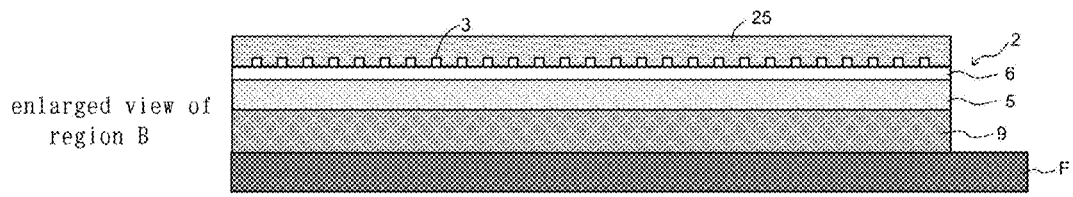
enlarged view of region B
[FIG. 8]
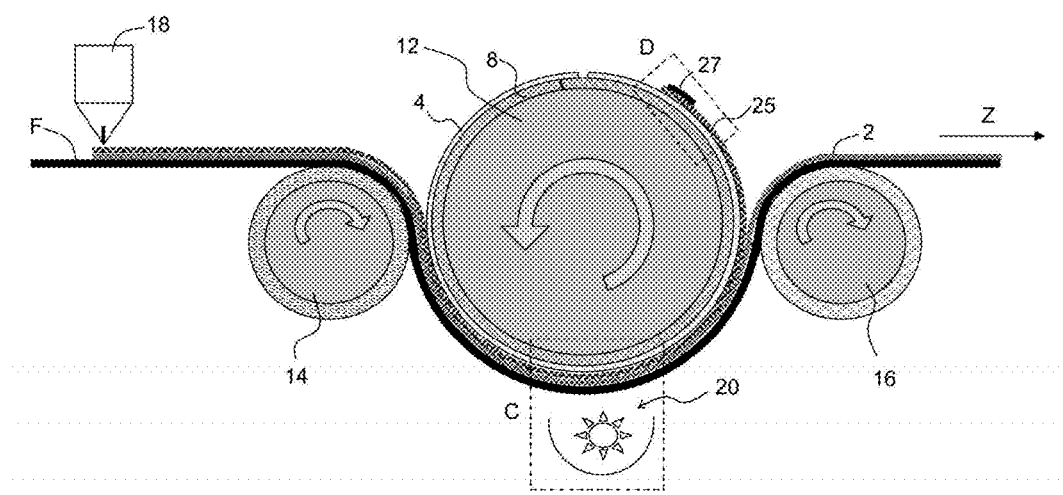
[FIG. 9]
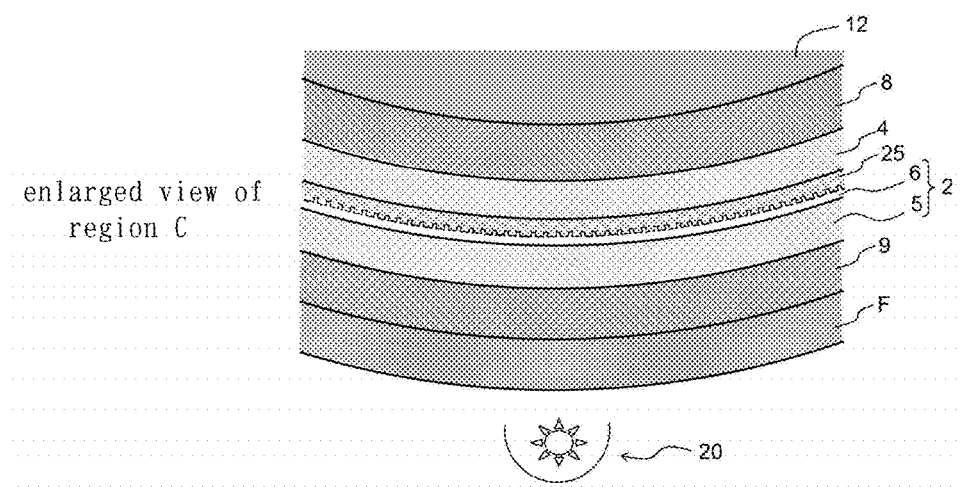
enlarged view of region C

[FIG. 10]
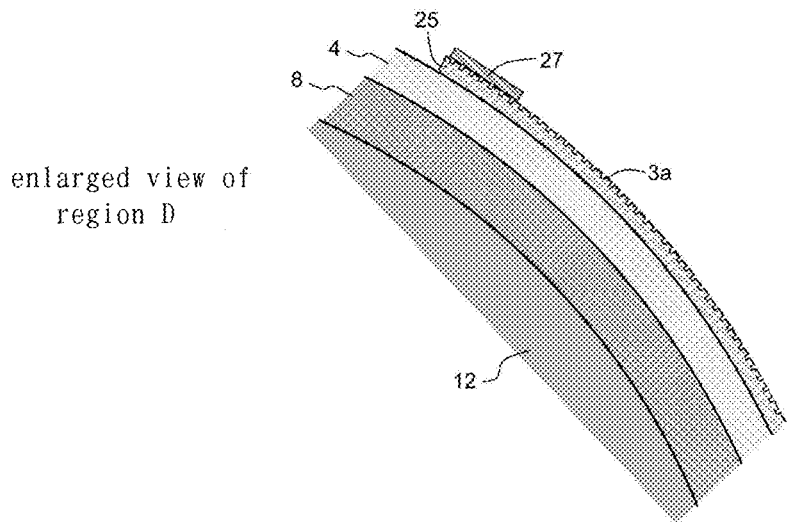
enlarged view of region D
[FIG. 11]
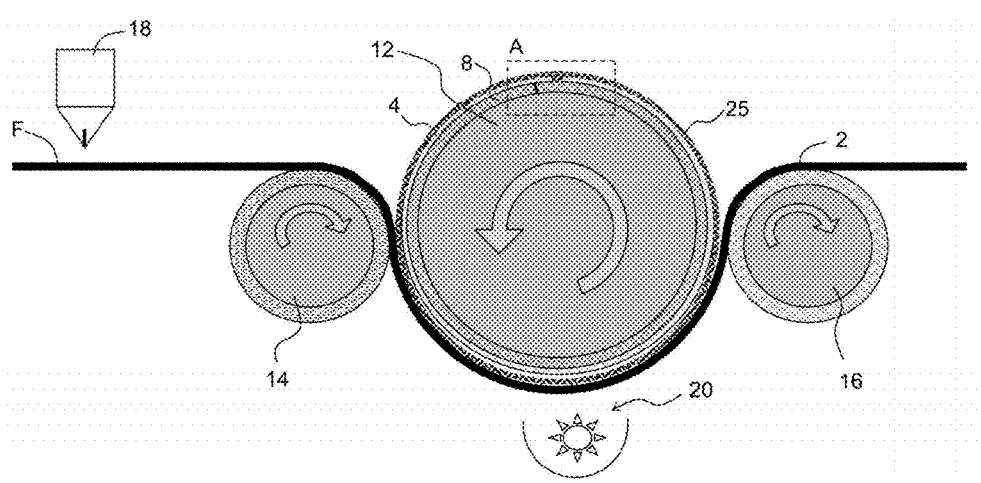
[FIG. 12]
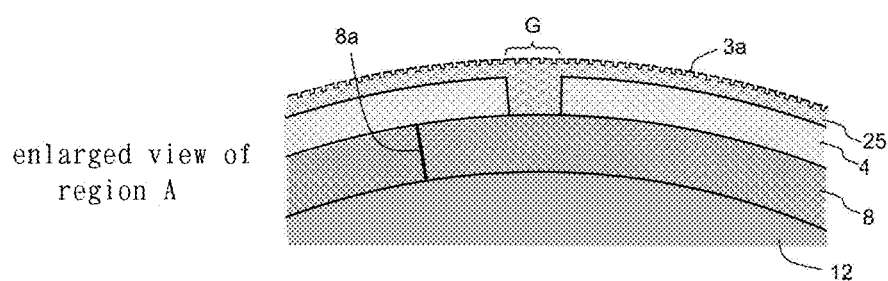
enlarged view of region A

IMPRINT MOLD MANUFACTURING METHOD

TECHNICAL FIELD

The present invention relates to a method for manufacturing an imprint mold.

BACKGROUND

Imprint technology is a fine processing technology, which uses a mold having a reverse pattern of the desired fine concave-convex pattern. The mold is pressed against a transferring material on a substrate, thereby transferring the reverse pattern of the mold onto the transferring material. Here, the transferring material is a liquid resin for example. The reverse pattern of the fine concave-convex pattern can vary between a nano-scale pattern of 10 nm-level size to a 100 μm-level size. The reverse pattern is used in a wide range of field including semiconductor materials, optical materials, recording media, micro machines, biotechnology, and environmental protection.

With respect to a transferring method to transfer the reverse pattern onto the transferring material, a method which first manufactures an imprint mold in the form of a roll by winding a film mold onto a transferring roll, and then performs a roll to roll process to continuously transfer the reverse pattern onto the transferring material, can be mentioned for example.

In order to prepare the imprint mold in the form of a roll from the film mold, both ends of the film mold need be joined. As a method for joining the film mold, Patent Literature 1 discloses a technique in which the edge portions of the butted resin film are sandwiched with a pair of heaters, thereby pressure-fusing the edge portion; and a technique in which the edge portions of the resin film to be joined are overlapped, followed by pressure-fusion of the portion to be joined.

CITATION LIST

Patent Literature

Patent Literature 1: WO2011/049097

SUMMARY OF THE INVENTION

Problems to be Solved by the Invention

However, when the end portions of the resin film were butted with each other and pressure-fused, the joining portion cannot be joined sufficiently, thereby resulting in a problematic circumstance where the joining portion separates later, or the transferring resin accumulating at the joining portion.

On the other hand, when the end portions of the resin film to be joined are partially overlapped and then pressure-fused, joining property can be improved; however, the joining portion would be uneven, resulting in a problematic circumstance where the transferring resin accumulates at the uneven portion.

The present invention has been made by taking the aforementioned circumstances into consideration. An object of the present invention is to provide a method for manufacturing an imprint mold which can prevent accumulation of the transferring resin onto the transferring roll.

Means to Solve the Problem

According to the present invention, a method for manufacturing an imprint mold, comprising: a resin coating step to coat a photo-curing resin composition or a thermosetting resin composition onto a pattern transferring mold having a fine concave-convex pattern; and a transferring step to transfer the resin composition throughout the entire circumference of a cylindrical transferring roll and cure the resin composition so that a reverse pattern of the concave-convex pattern is formed throughout the entire circumference of the cylindrical transferring roll, is provided.

With such method, the resin composition coated onto the mold is cured while transferring the resin composition throughout the entire circumference of the transferring roll. Accordingly, there would be no gap throughout the entire circumference of the transferring roll, thereby preventing accumulation of the transferring resin.

Hereinafter, various embodiments of the present invention will be exemplified. The embodiments provided hereinafter can be combined with each other.

Preferably, the resin composition is a photo-curing resin; and the resin composition is cured by irradiating the resin composition with light while the resin composition is in contact with the transferring roll in the transferring step.

Preferably, the resin composition is coated onto the pattern transferring mold arranged on a conveying film conveyed by a roll to roll method in the resin coating step; and the reverse pattern in formed throughout the entire circumference of the transferring roll by conveying the pattern transferring mold coated with the resin composition towards the rotating transferring roll in the transferring step.

Preferably, the present invention further comprises an easy adhering treatment step to subject the transferring roll to an easy adhering treatment before the transferring step.

Preferably, the easy adhering treatment is a treatment to wind an easy adhering film onto the transferring roll.

Preferably, the easy adhering film is wound onto the transferring film so that a gap is formed at a butting portion of the both ends of the easy adhering film; and the resin composition is filled in the gap.

Preferably, the pattern transferring mold is a resin film mold; and a surface of the resin film mold is subjected to a releasing treatment.

Preferably, the resin composition comprises a releasing resin.

Preferably, a surface of the resin composition is subjected to a releasing treatment after the transferring step.

Preferably, a shielding material is provided at a proximity of a tip of the resin composition or at an end portion of the pattern transferring mold, during the transferring step.

BRIEF DESCRIPTION OF THE DRAWINGS

FIG. 1 is a cross sectional view of a step to wind an easy adhering film onto a transferring roll according to one embodiment of the present invention.

FIG. 2 is a cross sectional view showing a condition following the step of FIG. 1, after the easy adhering film is wound onto the transferring roll.

FIG. 3 is an enlarged view of region A in FIG. 2.

FIG. 4 is a cross sectional view showing the constitution of a pattern transferring mold used in one embodiment of the present invention.

FIG. 5 is a cross sectional view showing the pattern transferring mold of FIG. 4 being adhered onto a conveying film.

FIG. 6 is a cross sectional view showing a step following the step of FIG. 5, in which the resin composition is coated onto the pattern transferring mold.

FIG. 7 is an enlarged view of region B in FIG. 6.

FIG. 8 is a cross sectional view showing a step following the step of FIG. 6, in which the resin composition having the reverse pattern is being transferred onto the transferring roll.

FIG. 9 is an enlarged view of region C in FIG. 8.

FIG. 10 is an enlarged view of region D in FIG. 8.

FIG. 11 is a cross sectional view showing a condition following the step of FIG. 8, the resin composition having the reverse pattern being transferred throughout the entire circumference of the transferring roll.

FIG. 12 is an enlarged view of region A in FIG. 11.

DESCRIPTION OF EMBODIMENTS

Hereinafter, the preferred embodiments of the present invention will be described specifically with reference to the drawings.

The method for manufacturing the imprint mold according to one embodiment of the present invention will be described with reference to FIGS. 1 to 12. The method for manufacturing the imprint mold according to the present embodiment comprises a resin coating step to coat a photo-curing resin composition 25 or a thermosetting resin composition 25 onto a pattern transferring mold 2 having a fine concave-convex pattern 3; and a transferring step to form a reverse pattern 3a of the concave-convex pattern 3 throughout the entire circumference of a cylinder transferring roll 12, wherein the resin composition 25 is transferred throughout the entire circumference of the transferring roll 12 while the resin composition 25 is cured.

There is no particular limitation regarding the apparatus for carrying out the present method. For example, as shown in FIG. 1, the present method can be carried out by using an imprint apparatus to imprint the concave-convex pattern onto the transferring material. The imprint apparatus comprises a transferring roll 12; an upper stream roll 14 to insert a conveying film F in between the transferring roll 12 and the upper stream roll 14, the upper stream roll 14 being arranged at the upper stream side of the transferring roll 12; and a lower stream roll 16 arranged at the lower stream side of the transferring roll. A forwarding roll (not shown) to forward the conveying film F is further arranged at the upper stream side of the upper stream roll 14, and a winding roll (not shown) to wind the conveying film F is further arranged at the lower stream side of the lower stream roll 16. Therefore, the conveying film F is conveyed by the roll to roll method. In addition, a coater 18 (a die coater for example) to coat the transferring material (photo-curing resin for example) onto the conveying film F is arranged in between the forwarding roll and the upper stream roll 14, and a light irradiator 20 (UV light for example) to cure the transferring material is arranged at the position lower of the transferring roll 12.

Hereinafter, each of the steps will be described in detail.

1. Easy Adhering Treatment Step

First of all, it is preferable that the present method comprises an easy adhering treatment step to conduct an easy adhering treatment to the transferring roll 12. The easy adhering treatment is a treatment to improve the affinity between the transferring roll 12 and the resin composition 25 so as to allow the resin composition 25 to transfer onto the transferring roll 12 easily during the transferring step described later. There is no particular limitation regarding the method for conducting this step. Here, it is preferable to conduct the easy adhering treatment by winding an easy adhering film 4 onto the transferring roll 12. The easy adhering film 4 shall have high affinity with the resin composition 25. For example, the adhering film 4 is made by forming an easy adhering layer onto at least one surface of a film made of a resin selected from the group consisting of polyethylene terephthalate, polycarbonate, polyester, polyolefin, polyimide, polysulphone, polyether sulfone, cyclic polyolefin, and polyethylene naphthalate. The easy adhering layer is formed with an acrylic resin, an urethane resin, a polyester resin, or a mixture of these resins. In addition, the easy adhering layer can contain a crosslinker or a silane coupling agent. As the crosslinker, an isocyanate compound, an epoxy compound, an oxazoline compound, and a melamine compound can be mentioned.

The length of the easy adhering film 4 can be approximately the same as the outer circumference length of the transferring roll 12 onto which the easy adhering film 4 is wound. Here, it is preferable that the length of the easy adhering film 4 is slightly shorter than the outer circumference length of the transferring roll 12. In such case, a gap G naturally occurs at the butting portion of both ends of the easy adhering film 4 when the easy adhering film 4 is wound onto the transferring roll 12. Accordingly, the butting portion of both ends of the easy adhering film 4 can be joined firmly by filling a resin composition 25 into the gap G.

Here, one example of the method for winding the easy adhering film 4 onto the transferring roll 12 will be described with reference to FIGS. 1 to 3.

First, one surface of a double-sided adhesive tape 8 having a separator 10 thereon is adhered onto one surface of the easy adhering film 4. There is no particular limitation regarding the structure of the double-sided adhesive tape 8, so long as the easy adhering film 4 can be adhered onto the transferring roll 12. Here, it is preferable that the adhesion strength at the surface to be adhered onto the easy adhering film 4 (hereinafter referred to as "film adhering surface") is higher than the adhesion strength at the surface to be adhered onto the transferring roll 12 (hereinafter referred to as "roll adhering surface"). In addition, it is preferable that the roll adhering surface is re-releasable. The easy adhering film is adhered onto the transferring roll 12 through the double-sided adhesive tape 8, followed by formation of the reverse pattern described later. Then, after usage as the imprint mold, the double-sided adhesive tape 8 and the easy adhering film 4 are removed together and disposed. Accordingly, it is preferable that the adhesion strength of the film adhering surface of the double-sided adhesive tape 8 is high as possible, in order to prevent displacement of the double-sided adhesive tape 8 and the easy adhering film 4. On the other hand, the adhesion strength of the roll adhering surface of the double-sided adhesive tape 8 is preferably in the range so as to allow easy removal from the transferring roll 12 after usage and to assure usage, while being re-releasable.

The end portion of the double-sided adhesive tape 8 and the easy adhering film 4 in the direction of winding can be the same, but is preferably shifted. In such case, the position of the butting portion of both ends of the double-sided adhesive tape 8 and the butting portion of both ends of the easy adhering film 4 can be shifted when the easy adhering film 4 is wound onto the transferring roll 12 through the double-sided adhesive tape 8. Accordingly, the resin composition 25 filled into the butting portion of the both ends of the easy adhering film 4 can be filled into the portion other than the butting portion of the double-sided adhesive tape 8, thereby preventing the resin composition 25 from adhering with the transferring roll 12.

The length of the double-sided adhesive tape 8 is preferably substantially the same as the outer circumference length of the transferring roll 12. In such case, the double-sided adhesive tape 8 can be adhered onto the circumference of the transferring roll 12 without any gap. Accordingly, when the length of the easy adhering film 4 is slightly shorter than the outer circumference length of the transferring roll 12, the double-sided adhesive tape 8 would be slightly longer than the easy adhering film 4.

There is no particular limitation regarding the structure of the separator 10, so long as it can protect the adhesive agent layer at the roll adhering surface of the double-sided adhesive tape 8, and can be easily removed when winding the easy adhering film 4 onto the transferring roll 12.

Subsequently, as shown in FIG. 1, the easy adhering film 4 having the double-sided adhesive tape 8 with the separator 10 adhered thereon is arranged at the tangential line of the transferring roll 12, and then the easy adhering film 4 with the double-sided adhesive tape 8 is inserted in between the conveying film F and the transferring roll 12 while peeling off the separator 10 in the direction shown by the arrow Y. In this state, each of the rolls is rotated in the direction as indicated by each of the arrows. The easy adhering film 4 with the double-sided adhesive tape 8 is pressed against the transferring roll 12 by the upper stream roll 14, thereby adhering the roll adhering surface of the double-sided adhesive tape 8 onto the transferring roll 12.

By allowing each of the rolls to rotate in such condition, the easy adhering film 4 with the double-sided adhesive tape 8 becomes entirely wound onto the transferring roll 12, thereby achieving the structure as shown in FIGS. 2 and 3. FIG. 3 is an enlarged view of region A in FIG. 2.

As shown in FIG. 3, the double-sided adhesive tape 8 is adhered onto the entire circumference of the transferring roll 12, and there is substantially no gap at the butting portion 8a of both ends. Here, a narrow gap would cause no problem. Preferably, a gap G is provided at the butting portion of the both ends of the easy adhering film 4. The length of the gap G (here, the length in the circumference direction of the roll is referred to as "length", and the length in the direction of the rotation axis of the roll is referred to as "width") is not particularly limited. For example, the length is 0.1 to 2 mm, preferably 0.2 to 1 mm. By the existence of gap G, the resin composition 25 can flow into the gap G in the following step, thereby firmly joining both ends of the easy adhering film 4.

The easy adhering treatment step can be conducted before the resin coating step, or can be conducted in between the resin coating step and the transferring step.

2. Resin Coating Step

In this step, a photo-curing resin or a thermosetting resin as the resin composition 25 is coated onto the pattern transferring mold 2 having a fine concave-convex pattern 3.

Hereinafter, one example of the method for coating the resin will be described with reference to FIGS. 4 to 7.

The pattern transferring mold 2 can be formed using a conventional imprint technology. In one example, as shown in FIG. 4, the pattern transferring mold 2 comprises a flexible resin substrate 5, and a resin layer 6 having the desired fine concave-convex pattern is provided on the resin substrate 5.

Specifically, the resin substrate 5 is made of a resin selected from the group consisting of polyethylene terephthalate, polycarbonate, polyester, polyolefin, polyimide, polysulphone, polyether sulfone, cyclic polyolefin, and polyethylene naphthalate. The thickness of the resin substrate 5 is generally 6 to 188 µm, preferably to 100 µm. When the thickness is in such range, pressure can be applied onto the transferring roll 12 uniformly in the width direction of the transferring roll 12 during the transferring step. Accordingly, the resin composition 25 can be transferred onto the transferring roll 12 uniformly.

The resin forming the resin layer 6 can be any one of a thermoplastic resin, a thermosetting resin, and a photo-curing resin. As the resin, an acryl-based resin, a styrene-based resin, an olefin-based resin, a polycarbonate resin, a polyester-based resin, an epoxy resin, and a silicon-based resin can be mentioned.

The thickness of the resin layer 6 is usually 50 nm to 1 mm, preferably 500 nm to 500 µm. When the thickness of the resin layer 6 is in such range, imprint process can be performed without difficulty.

When the resin forming the resin layer 6 is a thermoplastic resin, a mold for forming the concave-convex pattern is pressed against the resin layer 6 with a pressing pressure of 0.5 to 50 MPa for 10 to 600 seconds while the resin layer 6 is kept under heating at a temperature higher than the glass transition temperature (Tg). Subsequently, the resin layer 6 is cooled to a temperature below Tg, followed by separation of the mold from the resin layer 6. Accordingly, the concave-convex pattern 3 is formed onto the resin layer 6. On the other hand, when the resin forming the resin layer 6 is a photo-curing resin, the mold for forming the concave-convex pattern is pressed against the resin layer 6 in the form of a liquid, and then the resin layer 6 is irradiated with curing light (general term for energy ray capable of curing the resin such as UV light, visible light, electron beam and the like) to cure the resin layer 6. Subsequently, the mold is separated to give the resin layer 6 having the concave-convex pattern 3. The resin layer 6 can be irradiated with the light from the resin substrate 4 side, or from the mold side when the mold is transparent with respect to the light. In addition, when the resin forming the resin layer 6 is a thermosetting resin, the resin layer 6 is heated up to the curing temperature in a condition where the mold for forming the concave-convex pattern is pressed against the resin layer 6 in the form of a liquid, thereby curing the resin layer 6. Subsequently, the mold is separated from the resin layer 6 to give the resin layer 6 having the concave-convex pattern 3.

There is no particular limitation regarding the surface pattern of the resin layer 6 (concave-convex pattern 3). Here, a pattern having an interval of 10 nm to 2 mm and a depth of 10 nm to 500 µm is preferable, and a pattern having an interval of 20 nm to 20 µm and a depth of 50 nm to 1 µm is more preferable. When the pattern is regulated in such range, the concave-convex pattern 3 can be sufficiently transferred onto the transferring body. As the surface pattern, moth-eye, line, cylinder, monolith, cone, polygonal pyramid, and microlens can be mentioned.

The surface of the resin layer 6 can be subjected to a releasing treatment to prevent the resin layer 6 from adhering with the resin composition 25. Here, the releasing treatment can include forming of a releasing layer (not shown). The releasing agent for forming the releasing layer (not shown) preferably comprises at least one type selected from the group consisting of a fluorosilane coupling agent, a perfluoro compound having an amino group or a carboxyl group, and a perfluoroether compound having an amino group or a carboxyl group. More preferably, the releasing agent comprises at least one type selected from the group consisting of a fluorosilane coupling agent, a one-end-aminated perfluoro(perfluoroether) compound, and a oneend-carboxylated perfluoro(perfluoroether) compound, either as a single compound or a mixture of single compound and multiple compounds. When the releasing agent as described above is used, the adhesion property of the releasing layer formed by the releasing agent with the resin layer 6 would be excellent, and the releasing property of the resin composition 25 from the releasing layer formed by the releasing agent would be excellent. The thickness of the releasing layer (not shown) is preferably 0.5 to 20 nm, more preferably 0.5 to 10 nm, and most preferably 0.5 to 5 nm. Here, in order to improve the adhesion between the releasing layer and the resin layer 6, the resin layer 6 can be added with an additive having a functional group capable of bonding with the releasing agent, as disclosed in WO 2012/018045.

In addition, regarding the resin forming the resin layer 6, when the resin layer 6 contains a releasing component by using a silicone resin such as polydimethylsiloxane (PDMS), copolymer of acryl-based monomer and silicone-based monomer, copolymer of acryl-based monomer and fluorine-based monomer, mixture of acryl-based polymer and silicone-based monomer, or a mixture of acryl-based polymer and fluorine-based monomer, the step of forming the releasing layer can be omitted, and thus it is preferable.

The length of the pattern transferring mold 2 is preferably the same as or is slightly longer than the outer circumference length of the transferring roll 12. When the length is such, the resin composition 25 coated onto the pattern transferring mold 2 can be transferred onto the entire circumference of the transferring roll 12.

Here, a double-sided adhesive tape 9 is adhered onto the pattern transferring mold 2 in order to adhere the pattern transferring mold 2 onto the conveying film F. As the conveying film F, the same resin used for the resin substrate 5 can be used, or a resin different from the resin used for the resin substrate 5 can be used. There is no particular limitation regarding the structure of the double-sided adhesive tape 9, so long as the double-sided adhesive tape 9 can adhere the pattern transferring mold 2 onto the conveying film F. The adhesive agent layer is preferably structured with an acryl-based adhesive agent composition in terms of cost and workability. There is no particular limitation regarding the acryl-based adhesive agent composition. For example, the ones having an additive such as a crosslinker formulated into the acryl-based polymer can be mentioned. The thickness of the adhesive agent layer is generally in the range of 5 to 50 μm.

As shown in FIG. 5, the pattern transferring mold 2 is adhered onto the conveying film F at the upper stream side of the coater 18.

In such condition, each of the rolls is rotated so as to convey the conveying film F in the direction shown by the arrow X in FIG. 5. At the same time, the resin composition 25 is ejected from the coater 18 as shown in FIG. 6 to coat the pattern transferring mold 2 with the resin composition 25. As shown in FIG. 7, the concave-convex pattern 3 is formed on the surface of the pattern transferring mold 2, and thus a reverse pattern 3a of the concave-convex pattern 3 is formed on the resin composition when the resin composition 25 is coated onto the concave-convex pattern 3.

The resin composition 25 is a thermosetting resin or a photo-curing resin. As the resin, an acrylic resin, an epoxy resin, and a silicone resin can be mentioned. When the resin is a thermosetting resin or a photo-curing resin, the resin can be easily cured after forming the pattern, and thus it can be handled easily.

The resin composition 25 is preferably a resin containing a releasing component (hereinafter referred to as a "releasing resin"). When the releasing resin is used, adhesion of the transferring material can be prevented while imprinting of the concave-convex pattern to the transferring material is conducted without forming the releasing layer after forming the reverse pattern onto the resin composition 25. As the releasing resin, a silicone resin such as polydimethyl siloxane (PDMS), a copolymer of acryl-based monomer and silicone-based monomer (including macromonomer), a copolymer of acryl-based monomer and fluorine-based monomer (including macromonomer), a mixture of an acryl-based polymer and a silicone-based monomer, and a mixture of an acryl-based polymer and a fluorine-based monomer can be mentioned for example. Here, the silicone resin and the copolymer of acryl-based monomer and silicone-based monomer are preferable. Such resins are available at low cost, and can exhibit its releasing property sufficiently with the transferring material onto which the reverse pattern of the concave-convex pattern is transferred by the roll to roll method.

Here, when the resin composition 25 is a thermosetting resin, it is preferable that the resin substrate 5, the resin forming the resin layer 6, the conveying film F, and the adhesive agent layer structuring the double-sided adhesive tape 9 contain a thermoconductive filler. By containing the thermoconductive filler, the resin composition 25 can be transferred onto the transferring roll 12 with shorter time. As the thermoconductive filler, aluminium hydroxide, magnesium hydroxide, calcium carbonate, magnesium carbonate, calcium silicate, magnesium silicate, calcium oxide, magnesium oxide, zinc oxide, aluminum oxide, titanium oxide, crystalline silica, amorphous silica, nickel oxide, iron oxide, copper oxide, aluminum nitride, silicon nitride, boron nitride, garium nitride, carbon black, carbon nanotubes, carbon fibers, and diamond can be mentioned for example.

On the other hand, when the resin composition 25 is a photo-curing resin, it is preferable that the resin substrate 5, the resin forming the resin layer 6, the conveying film F, and the adhesive agent layer structuring the double-sided adhesive tape 9 have high transparency. Specifically, the total light transmittance in the visible light wavelength range measured in accordance with JIS K7361 is 85% or higher, preferably 90% or higher, and more preferably 92% or higher; and the haze measured in accordance with JIS K7136 is 3% or less, preferably 1% or less. By using the resin substrate 5, the resin forming the resin layer 6, the conveying film F, and the adhesive agent layer structuring the double-sided adhesive tape 9 having such high transparency, the resin composition 25 can be cured uniformly with shorter time using the light irradiator 20 described later.

3. Transferring Step

In this step, the resin composition 25 is transferred throughout the entire circumference of the cylindrical transferring roll 12 and the resin composition 25 is cured. Accordingly, the reverse pattern 3a of the concave-convex pattern 3 is formed throughout the entire circumference of the transferring roll 12.

Hereinafter, one example of the method for transferring the resin composition 25 will be described with reference to FIGS. 8 to 12.

After coating the resin composition 25 onto the pattern transferring mold 2 in the afore-mentioned step, the conveying film F is further conveyed as shown in FIG. 8. Here, in between the upper stream roll 14 and the transferring roll 12, the conveying film F is pressed towards the transferring roll 12 by the upper stream roll 14, thereby adhering the resin composition 25 on the pattern transferring mold 2 onto the transferring roll 12. When the conveying film F is further conveyed, the pattern transferring mold 2 would reach the lower side of the transferring roll 12. Then, as shown in FIG. 9, the resin composition 25 is cured at this position by the light irradiator 20, thereby forming the reverse pattern 3a of the concave-convex pattern 3. Subsequently, the conveying film F is further conveyed so as to reach the lower stream roll 16. Then the conveying film F is pulled by the winding roll (not shown) arranged at the lower stream side, and is thus conveyed in the direction shown by the arrow Z in FIG. 8. On the other hand, the transferring roll 12 is further rotated. Accordingly, the conveying film F is separated from the transferring roll 12. Here, a treatment is performed beforehand so that the affinity of the resin composition 25 with the transferring roll 12 is higher than the affinity of the resin composition 25 with the pattern transferring mold 2, since the cured resin composition 25 adheres to the one having higher affinity with the resin composition 25. Such treatment can be accomplished by performing one of or both of the easy adhering treatment to the transferring roll 12 and the releasing treatment to the pattern transferring mold 2. Accordingly, the resin composition 25 having the reverse pattern 3a can be transferred onto the transferring roll 12 as shown in FIG. 10.

In addition, a shielding material 27 is provided at the proximity of the tip of the resin composition 25 transferred onto the transferring roll 12 or at the end portion of the pattern transferring mold 2, in order to prevent the resin composition 25 from being further transferred onto the transferred resin composition during this transferring step. The shielding material 27 has a releasing property, and thus even when the resin composition 25 before curing is adhered onto the shielding material 27 and is then cured, the cured resin composition 25 can be removed easily. As the shielding material 27, a releasing material such as a silicone resin, a fluorine resin, an alkyd resin, a long-chain alkyl compound, and wax, as well as pigments and dyes having no or less light transparency, plastic films containing such pigments or dyes, films shielding ultraviolet ray such as a polyimide film, and metal films such as those using aluminum can be used for example. In addition, a light shielding film having a thin film of nickel provided at the back surface of the transferring mold 2 can be used.

Further, when the transferring of the resin composition 25 is further continued, the reverse pattern 3a of the concave-convex pattern 3 will be formed throughout the entire circumference of the transferring roll 12 as shown in FIG. 11. Here, the resin composition 25 goes into the gap G at the butting portion of both ends of the easy adhering film 4 and is cured in such condition. Accordingly, both ends of the easy adhering film 4 is firmly joined.

Although explanation was given for a case where the resin composition 25 is a photo-curing resin, the resin composition 25 can be a thermosetting resin. In such case, it is preferable to arrange a heater in place of the light irradiator under the transferring roll 12, thereby performing adequate thermal curing of the thermosetting resin and transferring of the resin composition 25 onto the transferring roll 12.

When the resin composition 25 is not a releasing resin, it is preferable that the pattern 3a is subjected to a releasing treatment as described above.

By performing the afore-mentioned steps, an imprint mold with continuous reverse pattern 3a throughout the entire circumference of the transferring roll 12 can be obtained. In addition, the imprint mold would be even, which is different from the conventional technique, and thus the problematic accumulation of the transferring resin would not occur.

By using such imprint mold, a concave-convex pattern can be formed continuously onto the transferring material. Specifically, each of the rolls of the imprint apparatus shown in FIG. 1 is rotated to convey the conveying film F, while the transferring material (photo-curing resin for example) is ejected from the coater 18. The transferring material is coated onto the conveying film F, and the seamless imprint mold wound onto the transferring roll 12 is pressed against the transferring material, and the transferring material is irradiated with light from the light irradiator 20 to cure the transferring material. Accordingly, the concave-convex pattern can be formed onto the transferring material continuously.

EXPLANATION OF SYMBOLS

2: pattern transferring mold, 3: concave-convex pattern, 3a: reverse pattern, 4: easy adhering film, 5: resin substrate, 6: resin layer, 8,9: double-sided adhesive tape, 8a: butting portion of double-sided adhesive tape, 10: separator, 12: transferring roll, 14: upper stream roll, 16: lower stream roll, 18: coater, 20: light irradiator, 25: resin composition, 27: shielding material, F: conveying film, G: gap

The invention claimed is:

1. A method for manufacturing an imprint mold, comprising:
    a resin coating step to coat a photo-curing resin composition or a thermosetting resin composition onto a pattern transferring mold having a fine concave-convex pattern;
    a transferring step to transfer the resin composition throughout the entire circumference of a cylindrical transferring roll and cure the resin composition so that a reverse pattern of the concave-convex pattern is formed throughout the entire circumference of the cylindrical transferring roll;
    an easy adhering treatment step to subject the transferring roll to an easy adhering treatment before the transferring step;
    wherein the easy adhering treatment is a treatment to wind an easy adhering film onto the transferring roll;
    wherein the easy adhering film is wound onto the transferring roll so that a gap is formed at a butting portion of the both ends of the easy adhering film; and
    wherein the resin composition is filled in the gap.

2. The method of claim 1, wherein:
    the resin composition is a photo-curing resin; and
    the resin composition is cured by irradiating the resin composition with light while the resin composition is in contact with the transferring roll in the transferring step.

3. The method of claim 1, wherein:
    the resin composition is coated onto the pattern transferring mold arranged on a conveying film conveyed by a roll to roll method in the resin coating step; and
    the reverse pattern in formed throughout the entire circumference of the transferring roll by conveying the pattern transferring mold coated with the resin composition towards the rotating transferring roll in the transferring step.

4. The method of claim 1, wherein:
    the pattern transferring mold is a resin film mold; and
    a surface of the resin film mold is subjected to a releasing treatment.

5. The method according to claim 1, wherein the resin composition comprises a releasing resin.

6. The method according to claim 1, wherein a surface of the resin composition is subjected to a releasing treatment after the transferring step.

7. The method according to claim 1, wherein a shielding material is provided at a proximity of a tip of the resin composition or at an end portion of the pattern transferring mold, during the transferring step.

* * * * *